United States Patent [19]

Moon

[11] Patent Number: 5,742,345

[45] Date of Patent: Apr. 21, 1998

[54] SYSTEM FOR TRANSMITTING AND RECEIVING VIDEO SIGNALS USING INTERPOLATION OF ADAPTIVE FACTOR

[75] Inventor: Heon-Hee Moon, Kyungki-do, Rep. of Korea

[73] Assignee: SamSung Electronics Co., Ltd., Kyungki-do, Rep. of Korea

[21] Appl. No.: 235,311

[22] Filed: Apr. 29, 1994

Related U.S. Application Data

[63] Continuation-in-part of Ser. No. 874,398, Apr. 27, 1992, abandoned.

[30] Foreign Application Priority Data

Jul. 8, 1991 [KR] Rep. of Korea ................ 11489/1991

[51] Int. Cl.$^6$ ................................................ H04N 7/24
[52] U.S. Cl. ................................................ 348/420
[58] Field of Search ........................ 358/133; 348/420, 348/421, 390, 384, 699, 416, 402

[56] References Cited

U.S. PATENT DOCUMENTS

| | | | |
|---|---|---|---|
| 4,754,492 | 6/1988 | Malvar | 382/41 |
| 4,862,261 | 8/1989 | Tanaka | 358/133 |
| 4,897,832 | 1/1990 | Suzuki et al. | 370/81 |
| 4,903,138 | 2/1990 | Aragaki | 358/261.3 |
| 4,905,101 | 2/1990 | Ohata et al. | 360/36.2 |
| 4,920,414 | 4/1990 | Remus et al. | 358/133 |
| 5,136,371 | 8/1992 | Savatier et al. | 358/133 |
| 5,157,488 | 10/1992 | Pennebaker | 358/133 |
| 5,162,907 | 11/1992 | Keating et al. | 358/105 |
| 5,337,086 | 8/1994 | Fujinami | 348/402 |
| 5,347,311 | 9/1994 | Golin | 348/416 |
| 5,367,385 | 11/1994 | Yuan | 358/465 |

Primary Examiner—Thai Q. Tran
Assistant Examiner—Bryan S. Tung
Attorney, Agent, or Firm—Robert E. Bushnell, Esq.

[57] ABSTRACT

A system for transmitting and receiving video signals compressed into low and high frequency band blocks includes an adaptive modulation circuit and an adaptive demodulation circuit. The adaptive modulation circuit receives the video signal blocks to obtain a block adaptive factor and an index signal ID1, transmits the index signal ID1 to a channel, interpolates the block adaptive factor so as to obtain a picture element adaptive factor, and selects a final adaptive factor f1 from either one of the block adaptive factor or the picture element adaptive factor according to the video signals of the peripheral signal blocks. The adaptive demodulation circuit converts the index signal ID1 into the corresponding block adaptive factor f1, and interpolates the block adaptive factor to produce the picture element adaptive factor, so as to selectively provide the block or picture element factor according to the video signals of the peripheral blocks.

21 Claims, 6 Drawing Sheets

SYSTEM FOR TRANSMITTING AND RECEIVING VIDEO SIGNALS USING INTERPOLATION OF ADAPTIVE FACTOR

CROSS-REFERENCE TO RELATED APPLICATIONS

This application is a continuation-in-part of an application earlier filed in the U.S. Patent & Trademark Office on 27, Apr. 1992 and assigned Ser. No. 07/874,398, now abandoned, and makes reference to, incorporates the same herein, and claims all benefits accruing under 35 U.S.C. §§119 and 120 from that application and from a prior application for "*System For Transmitting And Receiving Video Signals Using Interpolation Of Adaptive Factor*" filed in the Korean Industrial Property Office on 8 Jul., 1991 and assigned Ser. No. 1991/11498.

BACKGROUND OF THE INVENTION

The present invention relates to a system for transmitting and receiving video signals, and more particularly, to an apparatus for selectively modulating and demodulating the video signals by obtaining block and picture element adaptive factors of the video signal blocks.

Conventionally, adaptive modulation technique is employed to suppress noise added to a video signal during transmission, wherein a transmitted video signal of low level is enhanced in the transmitter, and then reduced in the receiver by the amount enhanced at the transmitter. A typical system using such a conventional adaptive modulation technique for transmitting and receiving a video signal is shown in FIG. 1, and the signal converting characteristics are shown in FIGS. 2A and 2B.

Figure 1:
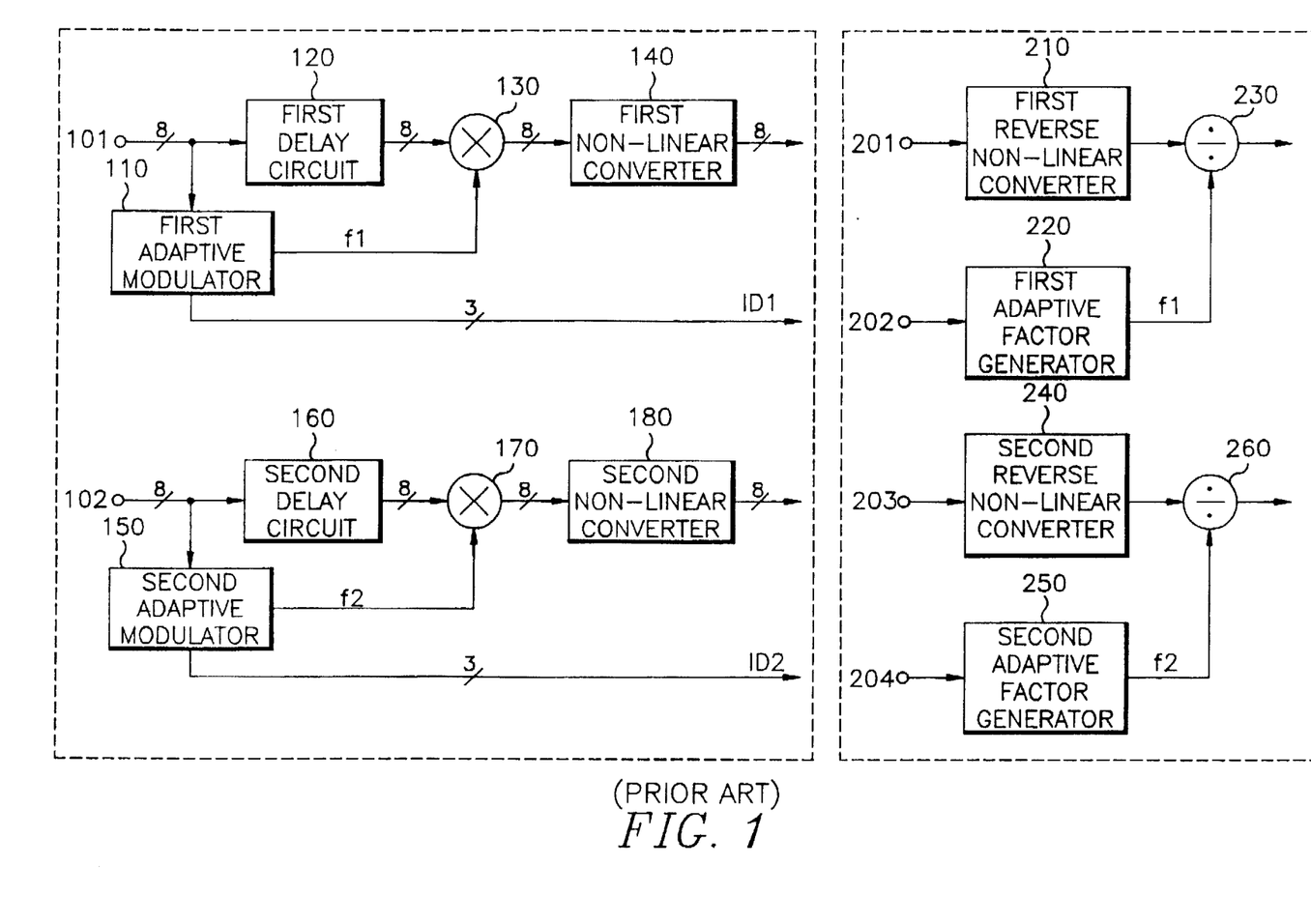
FIG. 1 is a block diagram for illustrating a conventional system for modulating and demodulating a video signal.
Figure 2A:
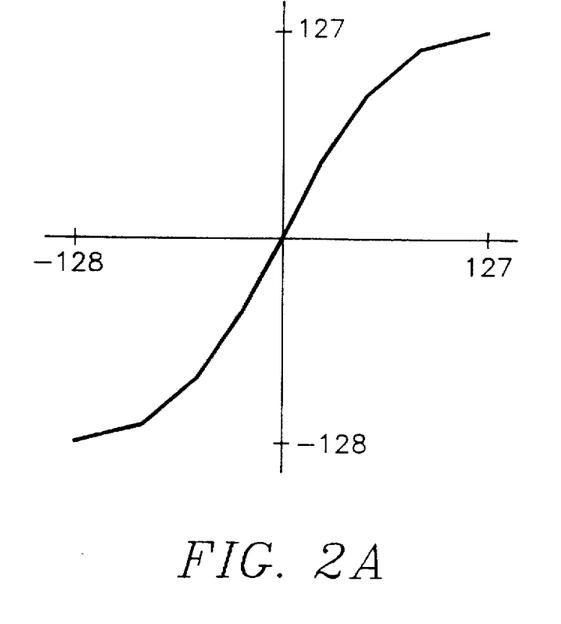
FIGS. 2A and 2B show graphs for illustrating the non-linear conversion characteristics of the low and high frequency band video signals of FIG. 1.
Figure 2B:
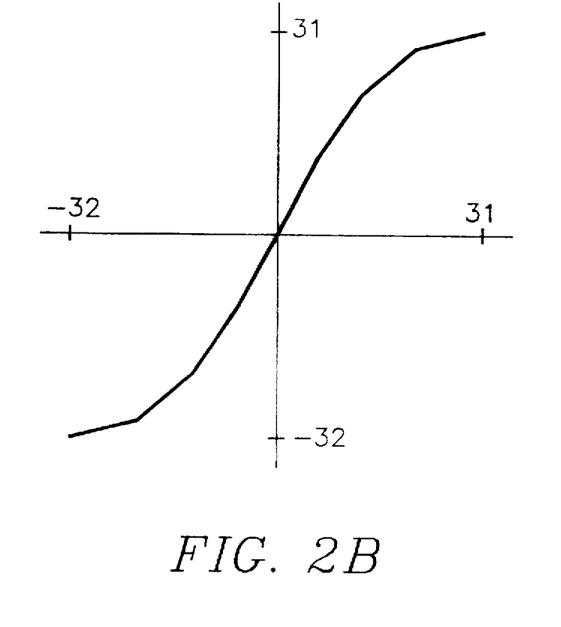

Referring to FIG. 1, a system for transmitting and receiving a video signal by employing the conventional adaptive modulation technique comprises an encoder at the transmission side and a decoder at the receiving side.

The encoder comprises a first adaptive modulator 110, a first delay circuit 120, a first multiplier 130, a first non-linear converter 140, a second adaptive modulator 150, a second delay circuit 160, a second multiplier 170, and a second non-linear converter 180. The first adaptive modulator 110 divides a video signal of low frequency band received via a low band input terminal 101 into given adaptive intervals, and determines the maximum value of the video signal in the respective intervals, so as to produce a first adaptive factor f1 and a first index signal ID1. The first delay circuit 120 delays the video signal of the low frequency band for a period during which the first adaptive factor f1 is obtained. The first multiplier 130 multiplies the delayed video signal of the low frequency band by the first adaptive factor f1. The output of the first multiplier 130 is non-linearly converted by the first non-linear converter 140. Likewise, the second adaptive modulator 150 divides a video signal of a high frequency band received via a high band input terminal 102 into given adaptive intervals, and determines the maximum value of the video signal in the respective intervals, so as to produce a second adaptive factor f2 and a second index signal ID2. The second delay circuit 160 delays the video signal of the high frequency band for a period during which the second adaptive factor f2 is obtained. The second multiplier 170 multiplies the delayed video signal of the high frequency band by the second adaptive factor f2. The output of the second multiplier 170 is non-linearly converted by the second non-linear converter 180.

Meanwhile, the decoder comprises a first reverse non-linear converter 210, a first adaptive factor generator 220, a first divider 230, a second reverse non-linear converter 240, a second adaptive factor generator 250, and a second divider 260. The first reverse non-linear converter 210 clips the portions of the received signal below a given level and non-linearly converts the adaptive modulated video signal of the low frequency band, which is received via a low band receiving input terminal 201, into a signal having reverse characteristics in comparison with to the received signal. The first adaptive factor generator 220 generates the first adaptive factor f1 corresponding to the first index signal ID1 received via a first index receiving terminal 202. The first divider 230 divides the video signal of the low frequency band of the first reverse non-linear converter 210 by the first adaptive factor f1 so as to recover the original video signal. The second reverse non-linear converter 240 non-linearly clips the portions of the received signal below a given level, and converts the adaptive modulated video signal of the high frequency band received via a high band receiving input terminal 203 into a signal having reverse characteristics in comparison with the received signal. The second adaptive factor generator 250 generates the second adaptive factor f2 corresponding to the second index signal ID2 received via a second index receiving terminal 204. The second divider 260 divides the video signal of the high frequency band from the second reverse non-linear converter 240 by the second adaptive factor f2 so as to recover the original video signal.

FIGS. 2A and 2B show the conversion characteristics of the low and high frequency band video signals of the first and second nonlinear converter 140 and 180, respectively.

In such conventional transmitting/receiving system for a video signal, the encoder divides the video signal into small blocks of sub-bands, and multiplies each of the blocks of sub-bands by a respective adaptive factor prior to transmission. Meanwhile, the decoder divides the picture element of each of the received blocks of sub-bands by the adaptive factor. This method is specifically disclosed in Korean Patent Serial No. 91-1023 granted to the applicant of the present invention.

Figure 3A:
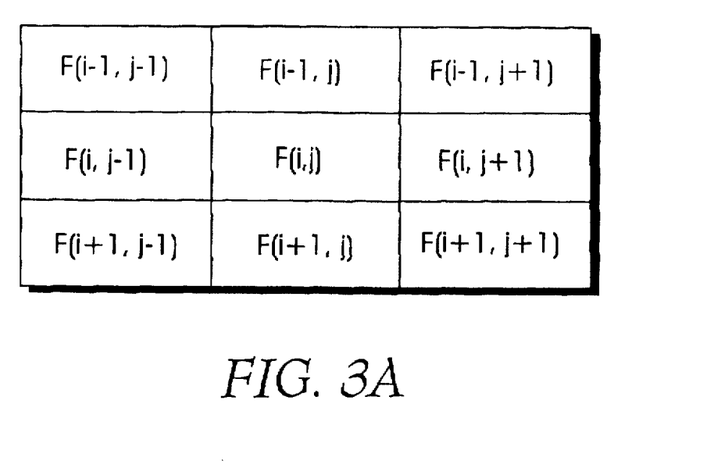
FIG. 3A illustrates the positional relationship between the present block adaptive factor and the peripheral (i.e., adjacent) block adaptive factors.
Figure 3B:
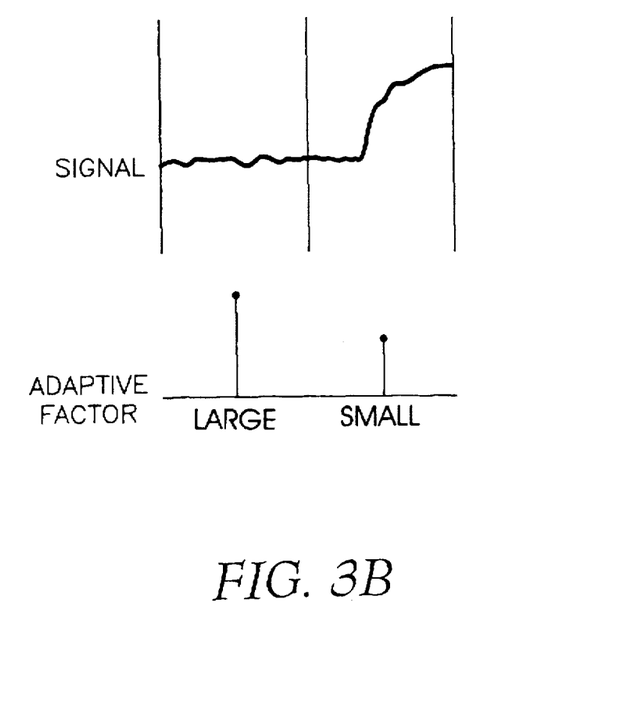
FIG. 3B illustrates the magnitude of the adaptive factor as a function of noise associated with a video signal.

Using this system however, as shown in FIG. 3B, results in the block effect, which causes the boundary of a picture to show blocks because of additive noise upon recovering of the original video signal due to the fact if the difference between the adaptive factors increases in the boundary portions of the picture considering the video signal in one dimension, there considerably differs the degree of suppressing the additive noise.

SUMMARY OF THE INVENTION

It is an object of the present invention to provide a means for decreasing the block effect, whereby a block adaptive factor is obtained according to a maximum value of the video signal blocks and is interpolated to produce a picture element adaptive factor so as to selectively subject the video signal to an adaptive modulation in consideration of the peripheral blocks.

It is another object of the present invention to provide a means for decreasing the block effect, whereby the received adaptive factor is interpolated so as to provide a picture element adaptive factor, thus selectively subjecting the received video signal to an adaptive demodulation.

According to the principles of the present invention, a transmitting/receiving system for video signals compressed into frequency band blocks, comprises:

(a) an adaptive modulation circuit for receiving the video signals of the respective blocks to obtain a block adaptive factor and an index signal corresponding to the block adaptive factor, transmitting said index signal to a channel, interpolating the block adaptive factor so as to obtain a picture element adaptive factor, and selecting a final adaptive factor among the block and picture element adaptive factors according to the video signals of the peripheral blocks;

(b) a delay circuit for delaying the video signals during the final adaptive factor being produced;

(c) a multiplier for multiplying the video signal of the delay circuit by the final adaptive factor;

(d) a non-linear converter for non-linearly converting the video signals of the multiplier, and for transmitting converted signal to the channel;

(e) a reverse non-linear converter for clipping the portions of the adaptive modulated video signals below a given level, and for converting the adaptive modulated video signals non-linearly but reversely with the non-linear converter;

(f) an adaptive demodulation circuit for converting the index signal into the corresponding block adaptive factor, and interpolating said block adaptive factor to produce the respective picture element adaptive factor being equal to that of the adaptive modulation circuit, so as to selectively provide the block or picture element factor according to the video signals of the peripheral blocks; and (g) a divider for dividing the video signals of the reverse non-linear converter by the adaptive factor of the adaptive demodulation circuit so as to recover the original block video signals.

BRIEF DESCRIPTION OF THE ATTACHED DRAWINGS

The invention itself, as well as other features and advantages thereof, will best be understood by reference to the following detailed description of a particular embodiment, read in connection with the accompanying drawings, wherein.

DETAILED DESCRIPTION OF A PREFERRED EMBODIMENT

The following description of the preferred embodiments is merely exemplary in nature and is in no way intended to limit the invention or its application or uses.

Figure 4:
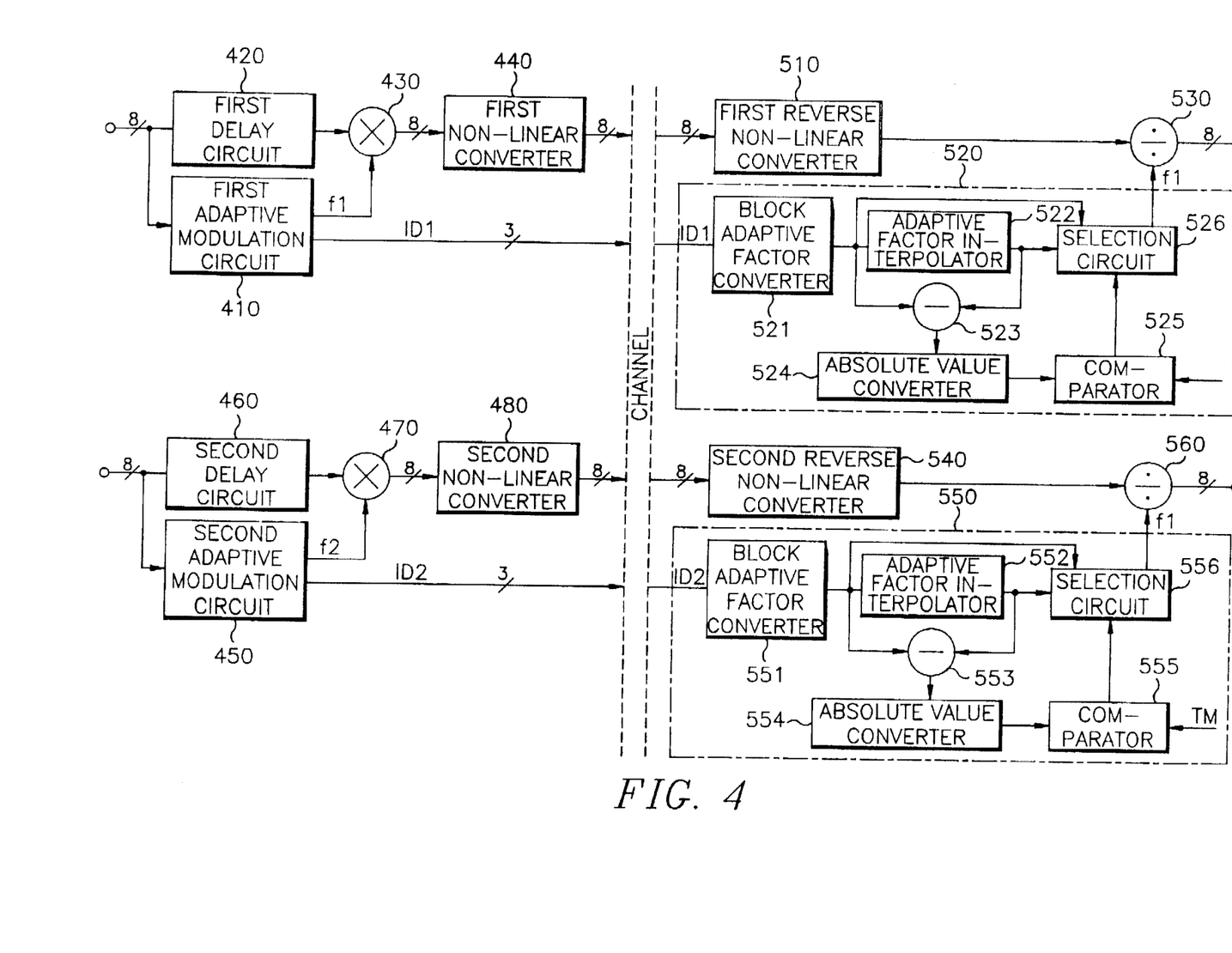
FIG. 4 is a block diagram for illustrating a system for modulating and demodulating a video signal constructed according to the principles of the present invention.

Referring now to FIG. 4, a first adaptive modulation circuit 410 receives and adaptively modulates video signals of low frequency compressed into band blocks to obtain a first block adaptive factor and a first index signal ID1 corresponding to the first block adaptive factor, and thereafter to transmit the first index signal ID1 to a channel. Then the first adaptive modulation circuit 410 interpolates the first block adaptive factor so as to obtain a picture element adaptive factor, and selects as a first adaptive factor f1 representative of either the first block adaptive factor or the picture element adaptive factor according to the video signals of the peripheral blocks. A first delay circuit 420 delays the video signals of low frequency band blocks for a delay period equivalent to a processing time of the first adaptive factor f1. A first multiplier 430 multiplies the delayed video signals of the first delay circuit 420 with the first adaptive factor f1. A first non-linear converter 440 non-linearly converts the video signals provided from the multiplier 430 and transmits the adaptively modulated video signals of low frequency band blocks to the channel.

A second adaptive modulation circuit 450 receives and adaptively modulates video signals of high frequency compressed into band blocks to obtain a second block adaptive factor and a second index signal ID2 corresponding to the second block adaptive factor, and thereafter to transmit the second index signal ID2 to the channel. Then the second adaptive modulation circuit 450 interpolates the second block adaptive factor so as to obtain a picture element adaptive factor, and selects either second block adaptive factor or the picture element adaptive factor as a second adaptive factor f2 according to the video signals of the peripheral blocks. A second delay circuit 460 delays the video signals of high frequency band blocks for a delay period equivalent to a processing time of the second adaptive factor f2. A second multiplier 470 multiplies the delayed video signal from the second delay circuit 460 with the second adaptive factor f2. A second non-linear converter 480 non-linearly converts the video signals provided from the second multiplier 470 and transmits the adaptively modulated video signals of high frequency band blocks to the transmission channel. All these component circuits constitute the encoder.

Meanwhile, the component circuits of the decoder are as follows: A first reverse non-linear converter 510 is used to clip the portions of the transmitted video signals below a given level, and to convert the adaptive modulated video signals of low frequency band blocks non-linearly in a reverse mode with respect to the first non-linear converter 440. A first adaptive demodulation circuit 520 converts the first index signal ID1 into the corresponding block adaptive factor, and interpolates the block adaptive factor to produce the respective picture element adaptive factor being equal to that of the adaptive interpolator 413 of the encoder (following described). Thereafter either the block or picture element adaptive factor is selectively produced as the first adaptive factor f1 according to the video signals of the peripheral blocks. A first divider 530 divides the video signals provided from the first reverse non-linear converter 510 by the first adaptive factor f1 provided from the first adaptive demodulation circuit 520 so as to recover the original block video signals.

A second reverse non-linear converter 540 is used to clip the portions of the video signals below a given level, and to convert the adaptive modulated video signals of high frequency band blocks non-linearly in a reverse mode with respect to the second non-linear converter 480. A second adaptive demodulation circuit 550 converts the second index signal ID2 into the corresponding block adaptive factor, and interpolates the block adaptive factor to produce the respective picture element adaptive factor being equal to the picture element adaptive factor at the adaptive interpolator 413 of the encoder, so as to selectively provide the block adaptive or picture element factor as the second adaptive factor f2, according to the video signals of the peripheral blocks. A second divider 560 divides the video signals of the second reverse non-linear converter 540 by the second adaptive factor f2 of the second adaptive demodulation circuit 550 so as to recover the original block video signals.

Figure 5:
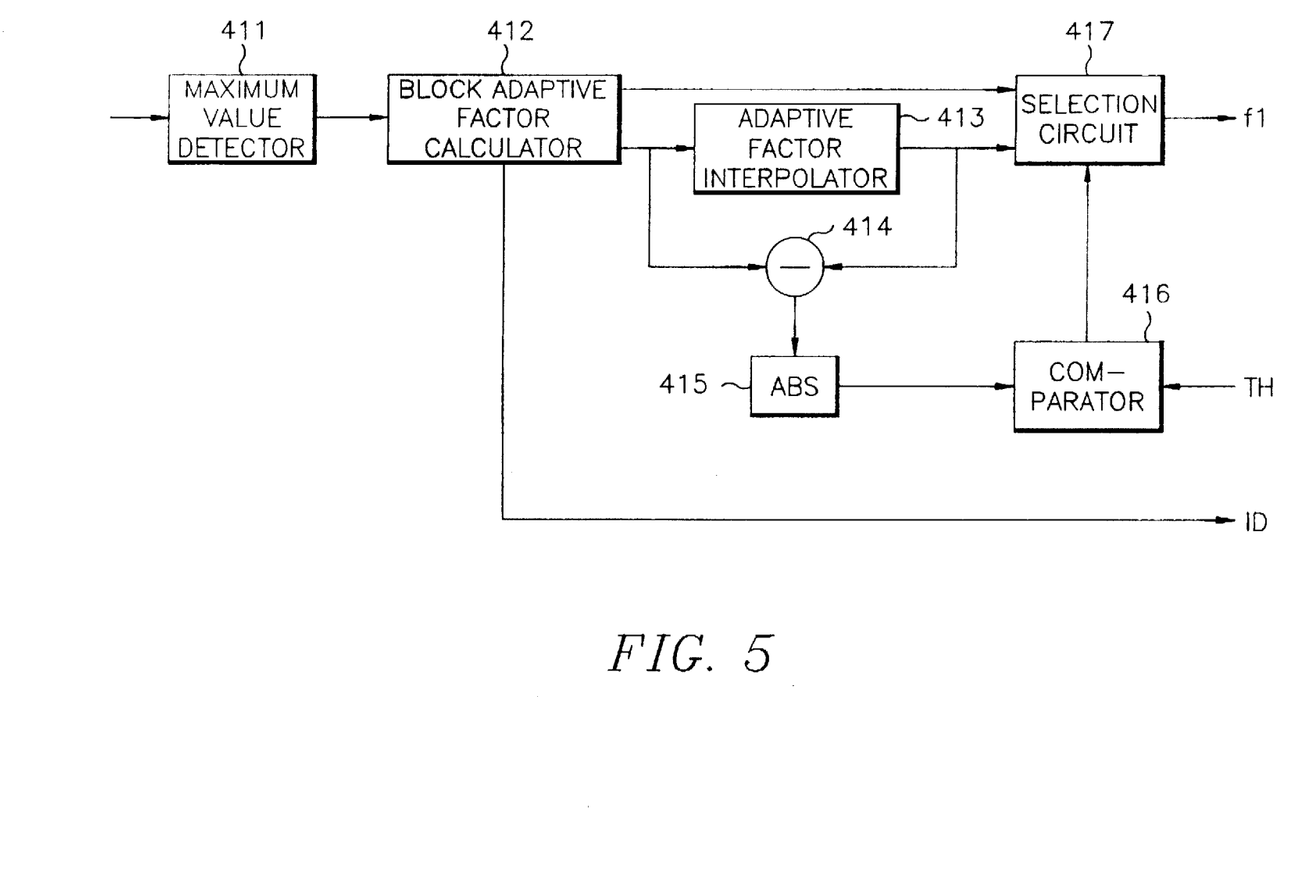
FIG. 5 is a block diagram for more specifically illustrating the adaptive modulation circuit of FIG. 4.

The respective first and second adaptive modulation circuits 410 and 450 are more specifically described with reference to FIG. 5. A maximum value detector 411 detects a maximum value of each received video signal block. A block adaptive factor calculator 412 produces a block adaptive factor corresponding to the maximum value from the maximum value detector 411 and an index signal corresponding to the block adaptive factor.

An interpolator 413 interpolates the block adaptive factor so as to produce the respective picture element adaptive factor. A subtractor 414 produces a difference signal between the block adaptive factor and the picture element adaptive factor. An absolute value converter 415 converts the difference signal provided from the subtractor 414 into an absolute value. A comparator 416 compares the absolute value provided from the absolute value converter 415 with a given reference signal so as to provide a first selection signal for selecting the picture element adaptive factor provided from the interpolator 413 or a second selection signal for selecting the block adaptive factor provided from the block adaptive factor calculator 412 according to whether the output of the absolute value converter 415 is greater or less than the reference signal. A selection circuit 417 selects either the picture element adaptive factor or the block adaptive factor according to whether the output of the comparator 416 is a first selection signal or a second selection signal.

Figure 6A:
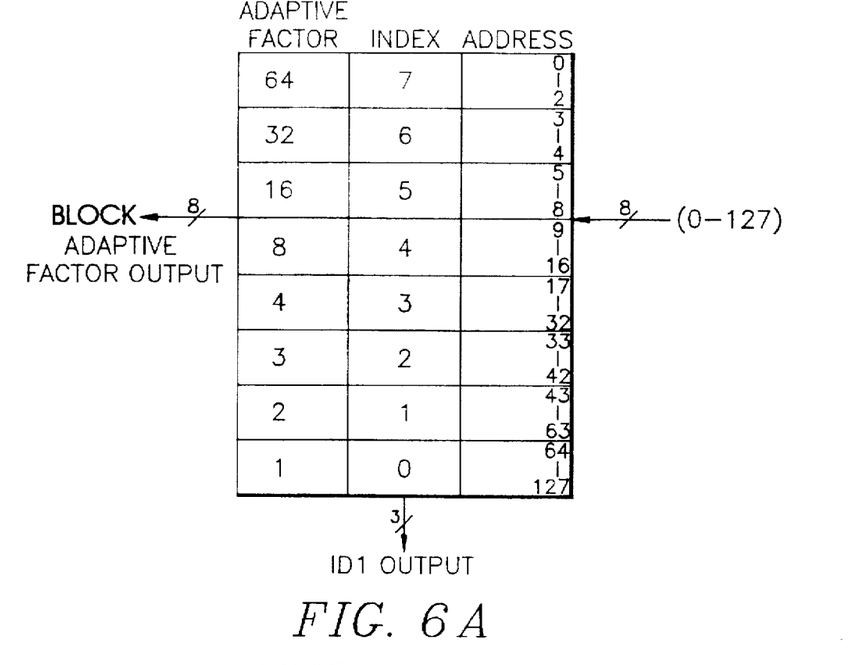
FIG. 6A illustrates a look-up table comprised of block adaptive factors for low frequency band video signals stored in the block adaptive factor calculator of FIG. 5.

The adaptive factor for a low frequency band video signal is shown in the table of FIG. 6A. The address levels extend from 0 to 127, index from 0 to 7, and the values of the first adaptive factors f1 corresponding to each number of the index are 1, 2, 3, 4, 8, 16, 32, 64. The logic of the table of FIG. 6A is stored into the block adaptive factor calculator 412 of the first adaptive modulation circuit 410 shown in FIG. 4.

Figure 6B:
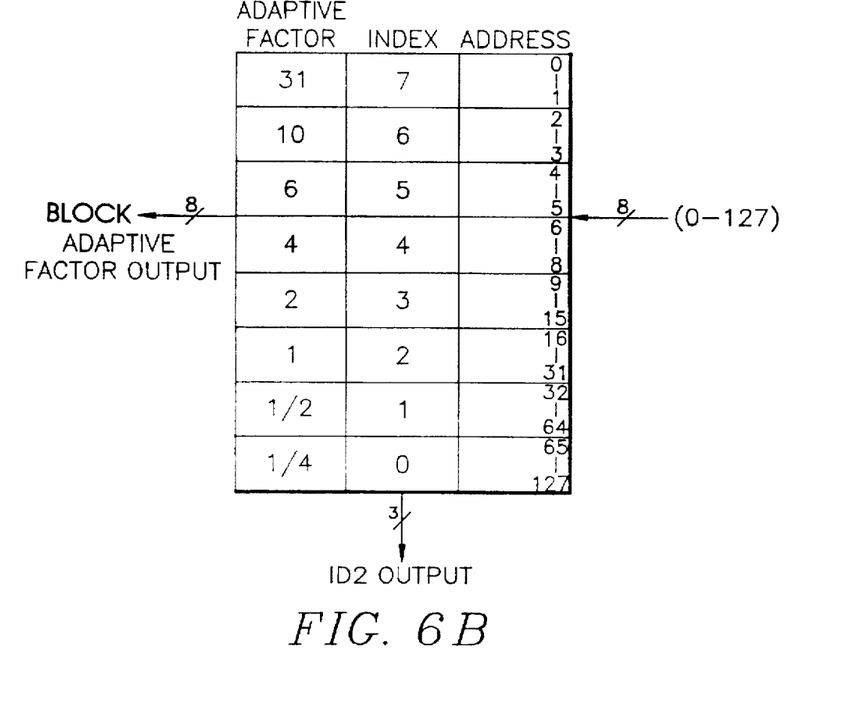
FIG. 6B illustrates a look-up table comprised of block adaptive factors for high frequency band video signals stored in the block adaptive factor calculator of FIG. 5.

The block adaptive factor of a high frequency band video signal is shown in the table of FIG. 6B. The address levels extend from 0 to 127, index from 0 to 7, and the values of the second adaptive factors f2 corresponding to each number of the index are ¼, ½, 1, 2, 4, 6, 10, 31. The logic of the table of FIG. 6B is stored into the block adaptive factor calculator 412 of the second adaptive modulation circuit 450 shown in FIG. 4.

In operation, an adaptive factor of each video signal block is obtained and interpolated so as to produce a respective picture element adaptive factor for each of the picture elements of the block. If the present position of the video signal block is assumed as (i, j) as shown in FIG. 3A, the current block adaptive factor is F(i, j) and the adaptive factors of the peripheral blocks are F(i−1,j), F(i+1,j), F(i,j−1), F(i,j+1); where F(i−1,j) represents an upper block adaptive factor; F(i+1,j) represents a lower block adaptive factor; F(i,j−1) represents a left block adaptive factor; and F(i,j+1) represents a right block adaptive factor. The term "F" itself is used to designate each pixel value in a given block as a function of position. These adaptive factors of the peripheral blocks are employed to obtain the adaptive factor of each of the picture elements. In this case, the final adaptive factor becomes relatively greater or less by the interpolation, according to whether the adaptive factor of the present block is less or greater than the adaptive factor of the peripheral blocks. Hence, if the difference between the current block adaptive factor and the peripheral block adaptive factor becomes great, the picture element adaptive factor is selected as the final adaptive factor. However, if the final adaptive factor appears to have a value much greater or smaller than the original block adaptive factor and therefore causes degradation of the picture quality in the flat portions of the video signal in adaptive demodulation, the original block adaptive factor is used as the final adaptive factor.

Hereinafter, the adaptive modulation and demodulation are more specifically described. The video signals are coded into sub-bands to provide a plurality of video signal blocks of high and low band. The video signal block of low frequency band is applied simultaneously to the first adaptive modulation circuit 410 and the first delay circuit 420. The first adaptive modulation circuit 410 determines a maximum value of the low band video signal within a given adaptive block interval, and compares the maximum value with a transmittable maximum allowable value in the given adaptive block interval, so as to produce the block adaptive factor for subjecting the low band video signal to the adaptive modulation. The block adaptive factor is determined by the following Equation:

$$\text{Block Adaptive Factor} = \frac{K}{|I_{hmax}|} =$$

where K is the transmittable maximum allowable value for the low band video signal; and $|I_{hmax}|$ is the absolute maximum value of the signal within the adaptive interval. Here, the quantization of the video signal usually takes 8 bits, and therefore K is 128.

In the present embodiment, the block adaptive factor is obtained using not the above equation but by the look-up table as shown in FIG. 6A. In order to obtain the block adaptive factor, the first adaptive modulation circuit 410 is constructed as shown in FIG. 5. The maximum value detector 411 detects the maximum value of the low band video signal within the adaptive block interval; and the maximum value is used as an address of the block adaptive factor calculator 412 for identifying a corresponding adaptive factor stored in the look-up table as shown in FIG. 6A. Thereafter, the block adaptive factor calculator 412 outputs a 8 bit block adaptive factor corresponding to the input address and a first 3 bit index signal ID1 corresponding to the 8 bit block adaptive factor from the look-up table as shown in FIG. 6A.

The block adaptive factor is applied simultaneously to a first input terminal of the selection circuit 417 and the adaptive factor interpolator 413. The adaptive factor interpolator 413 interpolates the input block adaptive factor to provide a corresponding picture element adaptive factor. The subtractor 414 produces a difference signal based upon a subtraction between the block adaptive factor and the picture element adaptive factor; and the difference signal is converted by the absolute value converter 415 into an absolute value that is to be applied to the comparator 416, whereby the absolute value is compared with a reference signal TH. The reference signal TH is used for selecting the picture element adaptive factor as the first adaptive factor f1 when the difference between the present block adaptive factor and the peripheral block adaptive factors is relatively greater or smaller. That is, the comparator 416 generates either a first selection signal for selecting the picture element adaptive factor provided from the adaptive factor interpolator 413, or a second selection signal for selecting the block adaptive factor according to whether the output of the absolute value converter 415 is greater or smaller than the reference signal TH, respectively. Thus, the selection circuit 417 selects the picture element adaptive factor as the first adaptive factor f1 if the comparator 416 generates the first selection signal, or alternatively, selects the block adaptive factor as the first adaptive factor f1 if the comparator 416 generates the second selection signal.

While the first adaptive modulation circuit 410 produces the first adaptive factor f1, the first delay circuit 420 delays the input low band video signal. Accordingly the first multiplier 430 multiplies the delayed low band video signal by the first adaptive factor f1 with amplification. Then the first non-linear converter 440 non-linearly converts the adaptively amplified low band video signal by using a non-linear function with the characteristics as shown in FIG. 2A, so as to amplify the picture elements of low level which are not previously amplified at the first adaptive converter 410.

Meanwhile, the high band video signal is applied simultaneously to the second adaptive modulation circuit 450 and the second delay circuit 460. Likewise the second adaptive modulation circuit 450 produces the second adaptive factor f2 to subject the high band video signal to the adaptive modulation, and produces the second index signal ID2 corresponding to the second adaptive factor f2. In this case, the maximum allowable value K is 32, and the high band video signal is processed with 6 bits considering the components of the high band video signal are generally within the range of 0 to 63 [if there are given 32 off-sets, the range is −32 to 31]. The look-up table of FIG. 6B is used to find out the second adaptive factor f2. If the maximum value Ihmax1 exceeds 6 bits within the adaptive interval of the high band video signal component input as an address, the adaptive factor is set to have a coefficient of either ½ and ¼ so as to suppress the amplitude.

Thus, in the second adaptive modulation circuit 450, the maximum value detector 411 detects the maximum value of the high band video signal within the adaptive interval. The maximum value is applied as an address to the block adaptive factor calculator 412 to produce the block adaptive factor of the high band video signal and the second index signal ID2 of 3 bits corresponding thereto, thus transmitting to the channel. As stated above, the picture element adaptive factor is obtained from the high band block adaptive factor, and thereafter according to the states of adaptive factor of the peripheral block is selected the block adaptive factor or the picture element adaptive factor as the second adaptive factor f2.

Meanwhile, the second delay circuit 460 delays the input high band video signal during the second adaptive factor f2 being produced by the second adaptive modulation circuit 450. The second multiplier 470 multiplies the delayed high band video signal by the second adaptive factor f2 with amplification. The second non-linear converter 480 non-linearly converts the adaptively amplified high band video signal in conformity with 6 bits transmission by using the non-linear function of the characteristics as shown in FIG. 2B, thus amplifying the picture elements of low level which are not previously amplified in the second adaptive modulation circuit 450. The amplified picture elements are transferred to the channel.

There may be various interpolation techniques whereby the adaptive factor interpolator 413 of the first and second adaptive modulation circuits 410 and 450 interpolates the block adaptive factor. For instance, a two-dimensional filtering technique may be employed to interpolate the block adaptive factor in order to obtain the picture element adaptive factor.

If a video signal block is comprised of 4×3 picture elements as shown in the following Table 1, the picture element adaptive factors (a11–a34) of that video signal block are obtained by the following equations interpolating the present block adaptive factor with the peripheral (i.e., upper, lower, right and left) block adaptive factors with a multiplication of given fractional weighing values such as ½, ¼, ⅛ . . . in accordance with the positional relationship of each picture element.

TABLE 1

| a11 | a12 | a13 | a14 |
| a21 | a22 | a23 | a24 |
| a31 | a32 | a33 | a34 |

For example, assuming that the present block adaptive factor is F(i,j) as shown in FIG. 3A, and the upper, lower, right and left peripheral block adaptive factors are F(i−1,j), F(i+1,j), F(i,j−1), F(i,j+1), respectively. Each of the picture element adaptive factors (a11–a34) within a given video signal block comprised of 4×3 picture elements as shown in Table 1 are produced by the adaptive factor interpolator 413 by the following equations:

$$a11=\tfrac{1}{2}(F_{ij})+\tfrac{1}{4}(F_{i-1,j})+\tfrac{1}{4}(F_{i,j-1}),$$

$$a12=\tfrac{1}{2}(F_{ij})+\tfrac{3}{8}(F_{i-1,j})+\tfrac{1}{8}(F_{i,j+1}),$$

$$a13=\tfrac{1}{2}(F_{ij})+\tfrac{3}{8}(F_{i-1,j})+\tfrac{1}{8}(F_{i,j+1}),$$

$$a14=\tfrac{1}{2}(F_{ij})+\tfrac{1}{4}(F_{i-1,j})+\tfrac{1}{4}(F_{i,j+1}),$$

$$a21=\tfrac{1}{2}(F_{ij})+\tfrac{1}{2}(F_{i,j-1}),$$

$$a22=a23=\tfrac{1}{2}(F_{ij})+\tfrac{1}{8}\{(F_{i,j-1})+(F_{i-1,j})+(F_{i,j+1})+(F_{i+1,j})\},$$

$$a24=\tfrac{1}{2}(F_{i,j})+\tfrac{1}{2}(F_{i,j+1}),$$

$$a31=\tfrac{1}{2}(F_{i,j})+\tfrac{1}{4}(F_{i+1,j})+\tfrac{1}{4}(F_{i,j-1}),$$

$$a32=\tfrac{1}{2}(F_{i,j})+\tfrac{3}{8}(F_{i+1,j})+\tfrac{1}{8}(F_{i,j-1}),$$

$$a33=\tfrac{1}{2}(F_{i,j})+\tfrac{3}{8}(F_{i+1,j})+\tfrac{1}{8}(F_{i,j+1}),$$

$$a34=\tfrac{1}{2}(F_{i,j})+\tfrac{1}{4}(F_{i+1,j})+\tfrac{1}{4}(F_{i,j+1}),$$

where:
- a sum of the weighing values for each of the picture element adaptive factors is at unity; and
- the weighing values, for the purposes of practicing the principles of the present invention, can be arbitrarily set in different manners so long as the present block adaptive factor and the peripheral (i.e., upper, lower, right and left) block adaptive factors are considered.

The adaptive modulated high and low band video signals together with the first and second index signals ID1 and ID2 are transmitted to the receiver, and processed in reverse mode of the transmitter so as to recover the original high and low band video signals.

The adaptive modulated low band video signal is applied via the channel to the first reverse non-linear converter 510, and the first index signal ID1 is applied to the first adaptive demodulation circuit 520. The first reverse non-linear converter 510 clips the portions of the low band video signal below a given level through a coring process whereby the clipped portions of the low band video signal are taken as zero (0), and performs the non-linear reverse conversion of the video signal by using the conversion function of the characteristics reverse to that of the non-linear function as shown in FIG. 2A so as to chiefly eliminate the additive noise contained in the signal portion of low amplitude.

The block adaptive factor converter 521 of the first adaptive demodulation circuit 520 receives the first index signal ID1 to produce the block adaptive factor. In this case, the block adaptive factor converter 521 has the block adaptive factor table of the low band video signal as shown in FIG. 6A, and produces the block adaptive factor corresponding to the first index signal ID1. The block adaptive factor is applied simultaneously to the selection circuit 526 and the adaptive factor interpolator 522 to produce the respective picture element adaptive factor. Thus, the first adaptive demodulation circuit 520 selects as the first adaptive factor f1 the picture element adaptive factor or the block adaptive factor according to the difference between the present block adaptive factor and the peripheral block adaptive factors. The first divider 530 divides the low band video signal of the first reverse non-linear converter 510 by the first adaptive factor f1 of the first adaptive demodulation circuit 520 so as to recover the original low band video signal.

The second reverse non-linear converter 540 clips the portions of the high band video signal below a given level through coring process whereby the portions of the low band video signal below a given level are taken as zero (0), and performs the non-linear reverse conversion of the video signal by using the conversion function of the characteristics reverse to that of the non-linear function as shown in FIG. 2B so as to chiefly eliminate the additive noises contained in the signal portion of low amplitude.

The second adaptive demodulation circuit 550 receives the second index signal ID2 to produce the corresponding second adaptive factor f2 in the same way that the first adaptive demodulation circuit 520 produces the first adaptive factor f1. In this case, the second adaptive factor f2 may be obtained by using the adaptive factor table as shown in FIG. 6B.

The second divider 560 divides the high band video signal of the second reverse non-linear converter 540 by the second adaptive factor f2 of the second adaptive demodulation circuit 550 so as to recover the original high band video signal.

Thus, the transmitter analyzes the adaptive factors of the present block and the peripheral blocks of the high and low band video signals so as to select as the final adaptive factor the block adaptive factor or the picture element adaptive factor, multiplies the original video signal by the final adaptive factor, and subjects it to non-linear conversion. On the other hand, the receiver divides the adaptive modulated high and low band video signals by the block adaptive factor or picture element factor reversely with the transmitter, thus reducing the additive noise as well as eliminating the block effect.

Although the invention has been described with reference to the specific embodiment, this description is not meant to be construed in a limiting sense, as other embodiments of the invention will become apparent to person skilled in the art upon reference to the foregoing description of the invention. It is therefore contemplated that the appended claims will cover any such modifications or embodiments as fall within the true scope of the invention.

What is claimed is:

1. A system for transmitting and receiving video signals compressed into frequency band blocks, comprising:
    adaptive modulation means coupled to receive video signals of the frequency band blocks, for converting said video signals of each frequency band block into a block adaptive factor and a corresponding index signal, thereafter transmitting said index signal to a channel and interpolating said block adaptive factor to produce a respective picture element adaptive factor for each picture element contained in said frequency band block, and for selecting one of said block adaptive factor and said respective picture element adaptive factor as a first adaptive factor according to the video signals of peripheral blocks;
    delay means for delaying said video signals while said first adaptive factor is produced to provide delayed video signals;
    multiplier means for multiplying the delayed video signals by said first adaptive factor to provide multiplied video signals;
    non-linear converter means for non-linearly converting the multiplied video signals to provide adaptive modulated video signals, and transmitting said adaptive modulated video signals to said channel;
    reverse non-linear converter means for clipping the portions of the adaptive modulated video signals below a given level, and for converting said adaptive modulated video signals non-linearly in a reverse mode with respect to said non-linear converter means;
    adaptive demodulation means coupled to receive said index signal, for converting said index signal into the corresponding block adaptive factor for each frequency band block, thereafter interpolating said corresponding block adaptive factor to produce a respective picture element adaptive factor equivalent to the picture element adaptive factor at said adaptive modulation means, and for selectively providing as a second adaptive factor from one of said block adaptive factor and said respective picture element factor according to the video signals of said peripheral blocks; and
    divider means for dividing the video signals of each frequency band block from said reverse non-linear converter means by said second adaptive factor of said adaptive demodulation means to recover the original video signals.

2. A system as claimed in claim 1, wherein said adaptive modulation means comprises:
    maximum value detector means for detecting the maximum value of the received video signal block;
    block adaptive factor calculator means for producing said block adaptive factor corresponding to said maximum value, and for producing said index signal corresponding to said block adaptive factor;
    interpolator means for interpolating said block adaptive factor to produce said respective picture element adaptive factor for each picture element contained in each frequency band block;
    subtractor means for producing a difference signal between said block adaptive factor and said respective picture element adaptive factor;
    comparator means for comparing said difference signal with a reference signal to selectively provide one of first and second select signals when said difference signal is either greater or less than said reference signal, respectively; and selection means for selecting between said respective picture element adaptive factor and said block adaptive factor as said first adaptive factor in dependence upon one of said first and second select signals.

3. A system as claimed in claim 2, wherein said adaptive demodulation means comprises:

block adaptive factor converter means for receiving said index signal from said channel to produce the corresponding block adaptive factor;

interpolator means for interpolating said block adaptive factor to produce said respective picture element adaptive factor for each picture element contained in each frequency band block;

subtractor means for producing a difference signal between said block adaptive factor and said respective picture element adaptive factor;

comparator means for comparing the difference signal with a reference signal to provide one of first and second select signals when said difference signal is either greater or less than said reference signal, respectively; and selection means for selecting between said respective picture element adaptive factor and said block adaptive factor in dependence upon one of the first select signal and the second select signal.

4. The system as claimed in claim 1, wherein said video signals comprises of high frequency and low frequency components respectively compressed into a plurality of said frequency band blocks.

5. An encoder and decoder system using an adaptive modulation and demodulation, comprising:

means for receiving video signals representative of a plurality of frequency band blocks;

delay means for delaying said video signals for a delayed period to provide delayed video signals;

adaptive modulation means for modulating said video signals to provide first adaptive factors representative of one of block adaptive factors and picture element adaptive factors, and index signals corresponding to said block adaptive factors;

means for transmitting said index signals through a transmission channel;

multiplier means for multiplying said delayed video signals in dependence upon said first adaptive factors to provide adaptive modulated video signals;

first converter means for non-linearly converting and transmitting said adaptive modulated video signals through said transmission channel;

means for receiving the transmitted adaptive modulated video signals and said index signals from said transmission channel;

second converter means for clipping portions of said transmitted adaptive modulated video signals, and for non-linearly converting said transmitted adaptive modulated video signals to provide converted video signals;

third converter means for converting said index signals into corresponding block adaptive factors;

interpolator means for interpolating said corresponding block adaptive factors to provide said picture element adaptive factors;

means for subtracting said corresponding block adaptive factors and said picture element adaptive factors to provide difference signals, and for comparing said difference signals with reference signals to provide selected signals;

means for providing said second adaptive factors representative of one of block adaptive factors and picture element adaptive factors in dependence upon said selected signals; and divider means for dividing said converted video signals in dependence upon said second adaptive factors to provide demodulated video signals representative of original video signals.

6. The encoder and decoder system as claimed in claim 5, wherein said video signals comprises of high frequency and low frequency components.

7. The encoder and decoder system as claimed in claim 5, wherein said adaptive modulation means comprises:

maximum value detector means for detecting a maximum value of each block of said video signals;

block adaptive factor calculator means for producing each block adaptive factor corresponding to the detected maximum value and for producing said index signals corresponding to said block adaptive factors;

interpolator means for interpolating said block adaptive factors to produce said picture element adaptive factors in dependence upon peripheral blocks of said video signals;

subtractor means for producing said difference signals by dividing said block adaptive factors from said picture element adaptive factors;

comparator means for comparing said difference signals with said reference signals to selectively provide first and second selected signals; and selection means for selecting between said picture element adaptive factors and said block adaptive factors in dependence upon one of said first and second selected signals.

8. The encoder and decoder system as claimed in claim 7, wherein said block adaptive factor calculator means stores a look-up table comprising a plurality of addresses corresponding to a plurality of adaptive factors for enabling selection of one of said block adaptive factors in dependence upon said maximum value and for enabling production of the corresponding index signal in dependence upon said one of said block adaptive factors.

9. An adaptive modulator for an encoder and decoder system, comprising:

means for receiving video signals representative of a plurality of frequency band blocks;

maximum value detector means for detecting a maximum value of each frequency band block of said video signals;

block adaptive factor calculator means for producing each block adaptive factor corresponding to the detected maximum value and for producing index signals corresponding to said block adaptive factors;

interpolator means for interpolating said block adaptive factors to produce picture element adaptive factors in dependence upon peripheral blocks of said video signals;

subtractor means for producing difference signals by subtracting said picture element adaptive factors from said block adaptive factors;

comparator means for comparing said difference signals with reference signals to selectively provide first and second selected signals; and means for providing first adaptive factors representative of one of said picture element adaptive factors and said block adaptive factors in dependence upon one of said first and second selected signals.

10. The encoder and decoder system as claimed in claim 9, wherein said block adaptive factor calculator means stores a look-up table comprising a plurality of addresses corresponding to a plurality of adaptive factors for enabling selection of one of said block adaptive factors in dependence upon said maximum value and for enabling production of the corresponding index signal in dependence upon said one of said block adaptive factors.

11. A method for encoding and decoding video signals by adaptive modulation and demodulation, comprising the steps of:

receiving said video signals representative of a plurality of frequency band blocks;

delaying said video signals for a delayed period to provide delayed video signals;

adaptively modulating said video signals to provide first adaptive factors representative of one of block adaptive factors and picture element adaptive factors, and index signals corresponding to said block adaptive factors;

transmitting said index signals through a transmission channel;

multiplying said delayed video signals in dependence upon said first adaptive factors to provide adaptive modulated video signals;

non-linearly converting and transmitting said adaptive modulated video signals through said transmission channel;

receiving the transmitted adaptive modulated video signals and said index signals from said transmission channel;

clipping portions of said transmitted adaptive modulated video signals, and for non-linearly converting said transmitted adaptive modulated video signals to provide converted video signals;

converting said index signals into corresponding block adaptive factors;

performing an interpolation of said corresponding block adaptive factors to provide said picture element adaptive factors;

subtracting said corresponding block adaptive factors and said picture element adaptive factors to provide difference signals, and for comparing said difference signals with reference signals to provide selected signals;

generating said second adaptive factors representative of one of block adaptive factors and picture element adaptive factors in dependence upon said selected signals; and dividing said converted video signals in dependence upon said second adaptive factors to provide demodulated video signals representative of original video signals.

12. The method as claimed in claim 11, wherein said video signals comprises of high frequency and low frequency band blocks.

13. The method of claim 11, wherein said step of adaptively modulating said video signals further comprises the steps of:

detecting a maximum value of each block of said video signals;

generating each block adaptive factor in dependence upon the detected maximum value for each said corresponding block of said video signals and producing said index signals corresponding to said block adaptive factors;

performing said interpolation of said block adaptive factors to produce said picture element adaptive factors in dependence upon peripheral blocks of said video signals;

producing said difference signals by subtracting said picture element adaptive factors from said block adaptive factors;

comparing said difference signals with said reference signals to selectively provide first and second selected signals; and selecting between said picture element adaptive factors and said block adaptive factors in dependence upon one of said first and second selected signals.

14. The method as claimed in claim 11, further comprising a look-up table for storing a plurality of addresses corresponding to a plurality of adaptive factors for enabling selection of one of said block adaptive factors in dependence upon said maximum value and for enabling production of said index signal in dependence upon said one of said block adaptive factors.

15. A method for enabling transmission and reception of video signals compressed into a plurality of high and low frequency band blocks, comprising the steps of:

adaptively modulating said video signals of said high frequency band blocks and said low frequency band blocks into first block adaptive factors and corresponding index signals;

transmitting said index signals via a transmission channel and interpolating said first block adaptive factors to generate first picture element adaptive factors corresponding to said first block adaptive factors;

multiplying said video signals by ones of said first block adaptive factors and said first picture element adaptive factors in dependence upon said video signals of peripheral band blocks to produce multiplied video signals;

non-linearly convening the multiplied video signals to produce adaptive modulated video signals, and transmitting said adaptive modulated video signals via said transmission channel;

receiving said adaptive modulated video signals and said index signals from said transmission channel;

clipping portions of said adaptive modulated video signals below a given level, and converting said adaptive modulated video signals non-linearly in a reverse mode with respect to the non-linear converting of said multiplied video signals prior to transmission of said adaptive modulated video signals via said transmission channel to produce converted video signals;

converting said index signals into second block adaptive factors corresponding to said index signals and interpolating said second block adaptive factors to produce second picture element adaptive factors; and dividing said converted video signals by ones of said second block adaptive factors and said second element adaptive factors in dependence upon said video signals of peripheral band blocks to recover the original video signals having said plurality of high and low frequency band blocks.

16. The method as claimed in claim 15, wherein said first block adaptive factors are substantially equivalent to said second block adaptive factors and said first picture element adaptive factors are substantially equivalent to said second picture element adaptive factors.

17. The method as claimed in claim 15, wherein said step of adaptively modulating said video signals further comprises the steps of:

detecting a maximum value of each high and low frequency band block of said video signals within each adaptive interval;

generating each block adaptive factor corresponding to the detected maximum value and producing said index signal corresponding to each block adaptive factor;

performing an interpolation of each block adaptive factor to produce the corresponding picture element adaptive factor in dependence upon peripheral blocks of said video signals;

generating a difference signal by subtracting said picture element adaptive factor from said block adaptive factor;

comparing said difference signal with a reference signal to selectively provide one of first and second selected signals; and selecting between said picture element adaptive factor and said block adaptive factor in dependence upon one of said first and second selected signals.

18. The method as claimed in claim 15, further comprising a look-up table for storing a plurality of addresses corresponding to a plurality of adaptive factors for enabling selection of one of said block adaptive factors in dependence upon said maximum value and for enabling production of said index signal in dependence upon said one of said block adaptive factors.

19. A communication system, comprising:

means for receiving video signals comprising a plurality of frequency band blocks;

a maximum value detector for detecting a maximum value of each block of said video signals;

a block adaptive factor calculator having a look-up table comprising a plurality of addresses with a corresponding plurality of adaptive factors and plurality of index signals, for generating a block adaptive factor corresponding to the address designated by said maximum value for each block of said video signals, and for generating an index signal corresponding to said block adaptive factor;

means for interpolating said block adaptive factor to produce a respective picture element adaptive factor corresponding to each picture element contained in each block of said video signals, in dependence upon peripheral blocks of said video signals;

subtracting means for producing a difference signal by subtracting said respective picture element adaptive factor from said block adaptive factor;

comparator means for comparing said difference signal with a reference signal to selectively provide first and second selected signals;

selection means for generating a transmission adaptive factor upon making a selection between said respective picture element adaptive factor and said block adaptive factor in dependence upon one of said first and second selected signals;

means for modulating each block of said video signals delayed by a delay period in accordance with said transmission adaptive factor to generate adaptive modulated video signals; and means for non-linearly converting said adaptive modulated video signals for transmission along with said index signal through a transmission channel.

20. The communication system of claim 19, wherein said video signals comprise high frequency and low frequency components.

21. The communication system of in claim 19, further comprising:

means for receiving the adaptive modulated video signals and said index signal transmitted from said transmission channel;

means for clipping portions of the received adaptive modulated video signals, and for non-linearly converting said received adaptive modulated video signals to provide converted video signals;

means for converting the recorded index signal into a corresponding block adaptive factor;

a second interpolator for interpolating the corresponding block adaptive factor to provide a respective picture element adaptive factor corresponding to each picture element contained in each block of the received adaptive modulated video signals;

means for subtracting said corresponding block adaptive factor and said respective picture element adaptive factor to produce a difference signal;, and for comparing said difference signal with said reference signal to provide selected signals;

means for providing a reception adaptive factor representative of one of said corresponding block adaptive factor and said respective picture element adaptive factor corresponding to each picture element contained in each block of the received adaptive modulated video signals in dependence upon said selected signals; and a divider for dividing said converted video signals in dependence upon said reception adaptive factor to provide demodulated video signals representative of original video signals.

\* \* \* \* \*